(12) United States Patent
Kawase

(10) Patent No.: US 12,700,611 B2
(45) Date of Patent: Aug. 4, 2026

(54) SECONDARY BATTERY WITH IMPROVED JOINING BETWEEN WOUND ELECTRODE BODY AND ELECTRODE TERMINAL

(71) Applicant: Prime Planet Energy & Solutions, Inc., Tokyo (JP)

(72) Inventor: Hiroaki Kawase, Kakogawa (JP)

(73) Assignee: PRIME PLANET ENERGY & SOLUTIONS, INC., Tokyo (JP)

( * ) Notice: Subject to any disclaimer, the term of this patent is extended or adjusted under 35 U.S.C. 154(b) by 959 days.

(21) Appl. No.: 17/969,685

(22) Filed: Oct. 20, 2022

(65) Prior Publication Data

US 2023/0130915 A1 Apr. 27, 2023

(30) Foreign Application Priority Data

Oct. 22, 2021 (JP) ................................. 2021-173467

(51) Int. Cl.
    *H01M 10/04*     (2006.01)
    *H01M 50/103*     (2021.01)
    *H01M 50/46*     (2021.01)
    *H01M 50/463*     (2021.01)

(52) U.S. Cl.
    CPC ..... *H01M 10/0431* (2013.01); *H01M 50/103* (2021.01); *H01M 50/46* (2021.01); *H01M 50/463* (2021.01)

(58) Field of Classification Search
    CPC ......... H01M 10/0431; H01M 10/0587; H01M 50/103; H01M 50/46–469
    See application file for complete search history.

(56) References Cited

U.S. PATENT DOCUMENTS

| | | | |
|---|---|---|---|
| 2009/0202900 A1 | 8/2009 | Kuroda et al. | |
| 2012/0202097 A1* | 8/2012 | Kimura | H01M 10/0587 |
| | | | 429/94 |
| 2015/0086821 A1 | 3/2015 | Watanabe et al. | |
| 2015/0325832 A1 | 11/2015 | Saito et al. | |
| 2016/0118682 A1* | 4/2016 | Iizuka | H01M 10/0431 |
| | | | 429/94 |

(Continued)

FOREIGN PATENT DOCUMENTS

| | | |
|---|---|---|
| CN | 104285329 A | 1/2015 |
| CN | 104956535 A | 9/2015 |

(Continued)

*Primary Examiner* — Allison Bourke
*Assistant Examiner* — Travis L. Martin
(74) *Attorney, Agent, or Firm* — HAUPTMAN HAM, LLP

(57) ABSTRACT

Better joining between a wound electrode body and an electrode terminal is implemented. In a cross section orthogonal to a winding axis of a wound electrode body of the secondary battery herein disclosed, two separators respectively extend more inward of the wound electrode body than electrode sheets. A portion of one separator forming an innermost circumference of the wound electrode body is bound in a first curved part. An inner circumferential side end of the one separator is between a junction part of an electrode sheet and an electrode terminal, and a first top around the winding axis. A portion of the other separator forming the innermost circumference is bent in a second curved part, and the inner circumferential side end of the other separator is between the junction part and a second top around the winding axis.

7 Claims, 6 Drawing Sheets

(56) References Cited

U.S. PATENT DOCUMENTS

| | | |
|---|---|---|
| 2021/0351441 A1 | 11/2021 | Hosokawa et al. |
| 2022/0069359 A1 | 3/2022 | Yamada et al. |

FOREIGN PATENT DOCUMENTS

| | | |
|---|---|---|
| CN | 112740457 A | 4/2021 |
| CN | 112840493 A | 5/2021 |
| JP | 200185042 A | 3/2001 |
| JP | 2008204781 A | 9/2008 |
| JP | 4630855 B2 | 2/2011 |

* cited by examiner

100

100

SECONDARY BATTERY WITH IMPROVED JOINING BETWEEN WOUND ELECTRODE BODY AND ELECTRODE TERMINAL

CROSS REFERENCE TO RELATED APPLICATIONS

The present application claims priority based on Japanese Patent Application No. 2021-173467 filed on Oct. 22, 2021, the entire contents of which are incorporated by reference in the present specification.

BACKGROUND OF THE DISCLOSURE

1. Technical Field

The present disclosure relates to a secondary battery.

2. Background

Japanese Patent No. 4630855 discloses a secondary battery including an electrode body of a power generating element, a battery case for accommodating the electrode body, and an electrode terminal for connecting the electrode body and the battery case. The secondary battery disclosed in the same literature includes a wound electrode body obtained by winding a band-shaped separator, a band-shaped negative electrode sheet, and a band-shaped positive electrode sheet in a stacked manner in the winding axis direction. Such a wound electrode body is formed in such a manner that a part of the electrode sheet protrudes outward from the separator in the winding axis direction. Then, the protruding part is joined with the electrode terminal of the corresponding electrode.

On the other hand, Japanese Patent Application Publication No. 2008-204781 discloses a method for manufacturing a wound electrode body. The following is described: with the method for manufacturing a wound electrode body disclosed in the same literature, first, a band-shaped separator, a band-shaped negative electrode sheet, and a band-shaped positive electrode sheet are stacked one on another to be wound, thereby forming a spiral electrode body; then, the spiral electrode body is squashed, and formed into a flat shape; at this step, the winding start end of the sheet forming the wound electrode body is arranged at a prescribed position at the innermost circumference of the electrode body.

SUMMARY OF THE INVENTION

Incidentally, the present inventor wishes to implement better joining between the wound electrode body and the electrode terminal.

A secondary battery herein disclosed has a battery case having an accommodation space in a flat rectangular parallelepiped shape, a wound electrode body accommodated in the battery case, and a first electrode terminal and a second electrode terminal connected with the battery case and the wound electrode body. The wound electrode body includes a band-shaped first separator, a band-shaped first electrode sheet, a band-shaped second separator, and a band-shaped second electrode sheet. The first separator, the first electrode sheet, the second separator, and the second electrode sheet are made uniform in length direction, are sequentially stacked one on another, and are wound around the winding axis set in the width direction of the first electrode sheet, and, the cross section orthogonal to the winding axis is formed into a shape having a rectangular part and a first curved part and a second curved part sandwiching the rectangular part. Thus, the wound electrode body is accommodated in the accommodation space of the battery case. A part of the first electrode sheet protrudes from the first separator and the second separator on the first side along the winding axis, and is bound along the direction orthogonal to the winding axis to be joined with the first electrode terminal. A part of the second electrode sheet protrudes from the first separator and the second separator on the second side along the winding axis, and is bound along the direction orthogonal to the winding axis to be joined with the second electrode terminal.

In a cross section orthogonal to the winding axis, in the inner circumferential region of the wound electrode body, the first separator and the second separator extend more inward of the wound electrode body than the first electrode sheet and the second electrode sheet, respectively. Further, the portion of one separator of the first separator and the second separator forming the innermost circumference of the wound electrode body is bent in the first curved part. The inner circumferential side end of the one separator is arranged between the first junction part at which the first electrode sheet and the first electrode terminal are joined with each other or the second junction part at which the second electrode sheet and the second electrode terminal are joined with each other, and a first top of the first curved part around the winding axis of the wound electrode body. Further, the portion of the other separator of the first separator and the second separator forming the innermost circumference of the wound electrode body is bent in the second curved part. The inner circumferential side end of the other separator is arranged between the first junction part or the second junction part, and a second top of the second curved part around the winding axis of the wound electrode body.

In a secondary battery with such a configuration, the winding start end of the wound electrode body is bent at the first curved part and the second curved part. The inner circumferential side end of the first separator or the inner circumferential side end of the second separator is arranged between the first top or the second top, and the first junction part or the second junction part. For this reason, even slight deviation of the inner circumferential side end of the first separator or the inner circumferential side end of the second separator from a predetermined position is less likely to affect the joining between the electrode terminal and the wound electrode body. With the secondary battery herein disclosed, joining between the electrode terminal and the wound electrode body is less likely to be hindered by mutual deviation of the separators.

DETAILED DESCRIPTION OF THE PREFERRED EMBODIMENTS

Figure 1:
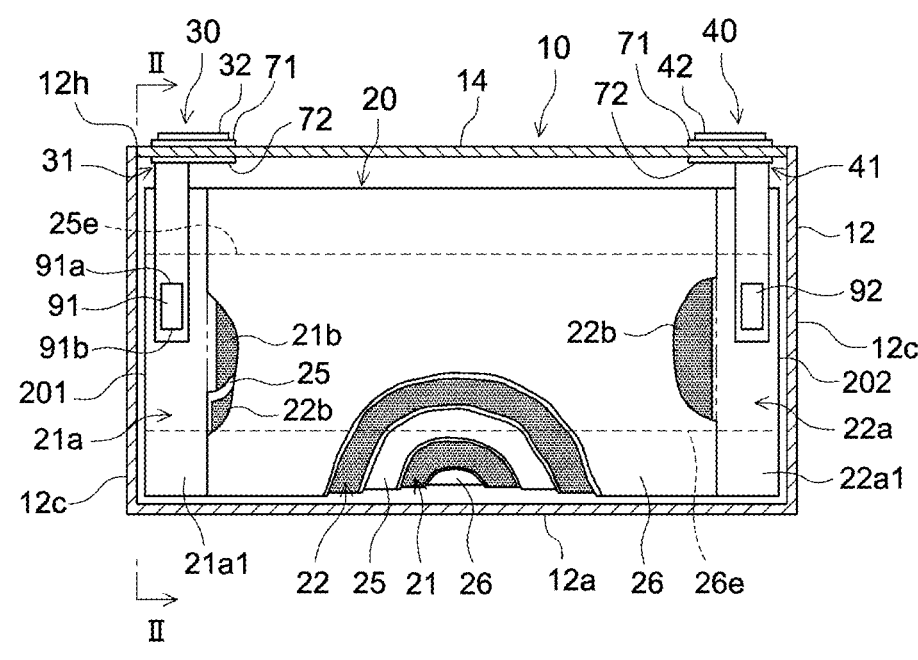
FIG. 1 is a partial cross sectional view of a secondary battery 100.

Below, one embodiment of a secondary battery herein disclosed will be described. The embodiment herein described is naturally not intended to particularly limit the present invention. The technology herein disclosed is not limited to the embodiments herein described unless otherwise stated. Each drawing is schematically drawn, and does not necessarily reflect the actual matter. Further, the expression such as "A to B" indicating the numerical value range means "A or more and B or less" unless otherwise stated, and includes even the meaning of "more than A and less than B". Incidentally, in the drawings described below, the members or portions producing the same action are given the same reference numerals and signs, and an overlapping description thereon may be omitted or simplified. Further, the dimensional relationship (length, width, thickness, or the like) in the drawings does not reflect the actual dimensional relations.

In the present specification, the term "secondary battery" represents an electric storage device in general in which electric charge carriers move between a pair of electrodes (a positive electrode and a negative electrode) via an electrolyte, thereby causing a charging and discharging reaction. Such secondary batteries also include a capacitor such as an electric double layer capacitor other than so-called storage batteries such as a lithium ion secondary battery, a nickel hydrogen battery, and a nickel cadmium battery. Below, a description will be given to an embodiment when a lithium ion secondary battery of the foregoing secondary batteries is targeted.

First Embodiment

Secondary Battery 100

Figure 2:
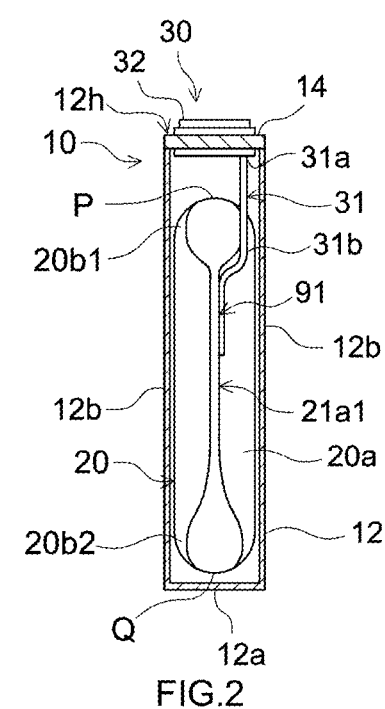
FIG. 2 is a II-II cross sectional view of FIG. 1.

FIG. 1 is a partially cross sectional view of a secondary battery 100. FIG. 1 shows a state in which the inside is exposed along the wide surface on one side of a case main body 12 in a generally rectangular parallelepiped shape. FIG. 2 is a II-II cross sectional view of FIG. 1. FIG. 2 shows a state in which the inside is exposed along the narrow surface on one side of the case main body 12 in a generally rectangular parallelepiped shape. As shown in FIGS. 1 and 2, the secondary battery 100 has a battery case 10, a wound electrode body 20, a positive electrode terminal 30, and a negative electrode terminal 40. Incidentally, the positive electrode terminal 30 is one example of the first electrode terminal in the secondary battery herein disclosed. The negative electrode terminal 40 is one example of the second electrode terminal in the secondary battery herein disclosed.

Battery Case 10

The battery case 10 has the case main body 12 having a rectangular shape of a generally rectangular parallelepiped shape opened at one side surface, and a lid 14 mounted at the opening as shown in FIGS. 1 and 2. In this embodiment, the case main body 12 and the lid 14 are each formed of aluminum or an aluminum alloy mainly including aluminum from the viewpoints of the weight reduction, and ensuring the required rigidity.

Case Main Body 12

The case main body 12 accommodates the wound electrode body 20, and has an opening 12h for accommodating the wound electrode body 20 as shown in FIGS. 1 and 2. The case main body 12 has an accommodation space in a flat rectangular parallelepiped shape opened at one side surface. The case main body 12 has, as shown in FIG. 1, a generally rectangular bottom surface 12a, a pair of wide surfaces 12b, and a pair of narrow surfaces 12c. The pair of wide surfaces 12b respectively rise from the long sides of the bottom surface 12a. The pair of narrow surfaces 12c respectively rise from the short sides of the bottom surface 12a. The opening 12h is formed in such a manner as to be surrounded by the long sides of the pair of wide surfaces 12b, and the short sides of the pair of narrow surfaces 12c.

Further, the case main body 12 may accommodate an electrolyte not shown together with the wound electrode body 20. As the electrolyte, a nonaqueous electrolyte obtained by dissolving a support salt in a nonaqueous solvent can be used. Examples of the nonaqueous solvent may include carbonates such as ethylene carbonate, dimethyl carbonate, and ethyl methyl carbonate. Examples of the support salt may include fluorine-containing lithium salt such as $LiPF_6$.

Lid 14

The lid 14 is attached to the opening 12h of the case main body 12. Then, the circumferential edge of the lid 14 is joined with the edge of the opening 12h of the case main body 12. Such joining is desirably accomplished by, for example, gapless continuous welding. Such welding can be implemented by, for example, laser welding. The case main body 12 and the lid 14 each have a size according to the number of accommodated wound electrode bodies 20, the size thereof, and the like.

Although not particularly shown, in this embodiment, the lid 14 is provided with a gas discharge valve and a liquid injection port. The gas discharge valve is a thin-walled part configured so as to rupture when the internal pressure of the secondary battery 100 becomes equal to, or larger than a prescribed value, and to discharge the gas in the secondary battery 100 to the outside. The liquid injection port is a through hole for introducing an electrolyte after joining the lid 14 to the case main body 12. The liquid injection port is sealed by, for example, a sealing member.

In this embodiment, to the lid 14, the positive electrode terminal 30 and the negative electrode terminal 40 are attached. The positive electrode terminal 30 and the negative electrode terminal 40 connect the battery case 10 and the wound electrode body 20.

Electrode Terminal

The positive electrode terminal 30 includes an internal terminal 31 and an external terminal 32. The negative electrode terminal 40 includes an internal terminal 41 and an external terminal 42. The internal terminals 31 and 41 are respectively attached in the inside of the lid 14 via an insulator 72. The external terminals 32 and 42 are respectively attached on the outside of the lid 14 via a gasket 71. The internal terminals 31 and 41 respectively extend to the inside of the case main body 12. The tip of the internal terminal 31 of the positive electrode is connected with an unformed part 21a1 of a positive electrode collecting foil 21a. The tip of the internal terminal 41 of the negative electrode is connected with an unformed part 22a1 of a negative electrode collecting foil 22a.

As shown in FIGS. 1 and 2, the internal terminal 31 of the positive electrode includes a base 31a and a connection piece 31b. The base 31a is, for example, a site arranged along the inner surface of the lid 14 via the insulator 72. The connection piece 31b is, for example, a site extending from one end of the base 31a. In this embodiment, the connection piece 31*b* extends toward the inside of the case main body 12. As shown in FIG. 2, the end of the connection piece 31*b* in the direction of extension of the connection piece 31*b* is joined with the unformed part 21*a*1 of the positive electrode. Such joining means has no particular restriction, and can be a conventional joining means such as ultrasonic welding, laser welding, or resistance welding. Incidentally, the internal terminal 41 on the negative electrode side is also similarly configured as that of the positive electrode side, and hence a description thereon will be herein omitted.

Wound Electrode Body 20

Figure 3:
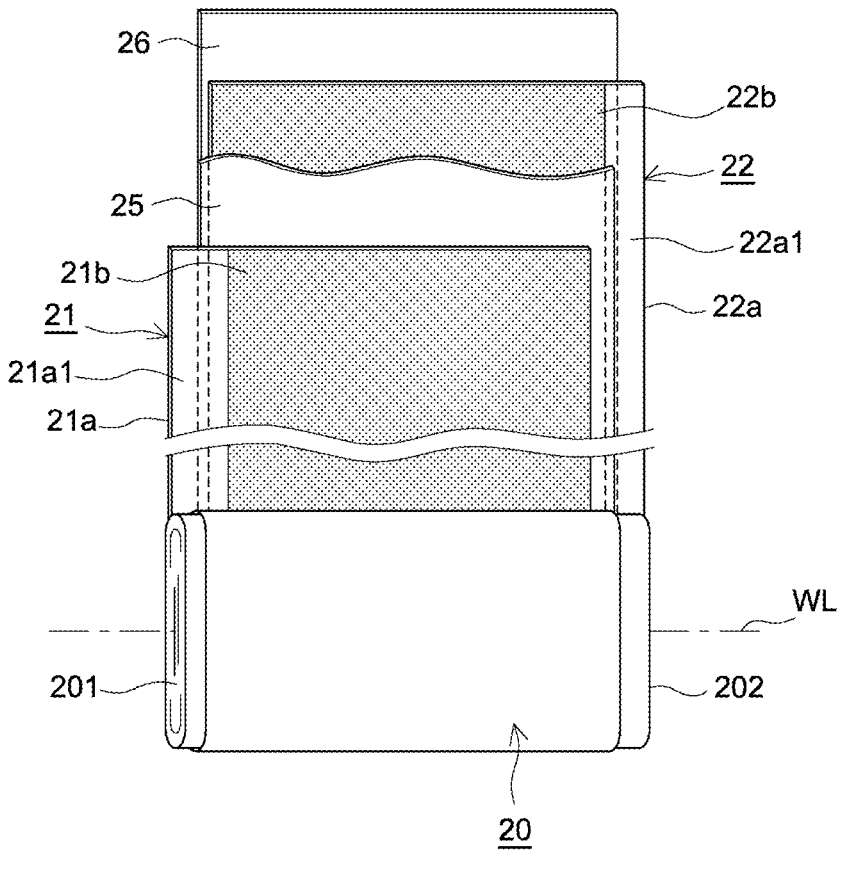
FIG. 3 is a schematic view for illustrating a configuration of a wound electrode body 20.

FIG. 3 is a schematic view for illustrating a configuration of the wound electrode body 20. The wound electrode body 20 is a power generating element of the secondary battery 100, and is accommodated while being covered with an insulating film (not shown), or the like in the case main body 12. As shown in FIGS. 1 and 3, the wound electrode body 20 includes a band-shaped first separator 25, a band-shaped positive electrode sheet 21, a band-shaped second separator 26, and a band-shaped negative electrode sheet 22. Incidentally, the positive electrode sheet 21 is one example of the first electrode sheet in the secondary battery herein disclosed. The negative electrode sheet 22 is one example of the second electrode sheet in the secondary battery herein disclosed.

Positive Electrode Sheet 21

In the positive electrode sheet 21, positive electrode active material layers 21*b* each including a positive electrode active material are formed on both surfaces of the positive electrode collecting foil 21*a* (e.g., aluminum foil) with predetermined width and thickness except for the unformed part 21*a*1 set with a given width at the end on one side in the width direction. The positive electrode active material is, for example, a material capable of releasing lithium ions during charging, and absorbing lithium ions during discharging as with a lithium transition metal composite material in a lithium ion secondary battery. For the positive electrode active material, various proposals have generally been made other than a lithium transition metal composite material, and there is no particular restriction thereon.

Negative Electrode Sheet 22

In the negative electrode sheet 22, negative electrode active material layers 22*b* each including a negative electrode active material are formed on both surfaces of the negative electrode collecting foil 22*a* (e.g., copper foil) with predetermined width and thickness except for the unformed part 22*a*1 set with a given width at the edge on one side in the width direction. The negative electrode active material is, for example, a material capable of occluding lithium ions during charging, and releasing the lithium ions occluded during charging during discharging as with natural graphite in a lithium ion secondary battery. For the negative electrode active material, various proposals have generally been made other than natural graphite, and there is no particular restriction thereon.

Separators 25 and 26

For the first separator 25 and the second separator 26, for example, a porous resin sheet through which an electrolyte having a required heat resistance can pass is used. Also, for the first separator 25 and the second separator 26, various proposals have been made, and there is no particular restriction thereon.

As shown in FIGS. 1 and 3, the width of the negative electrode active material layer 22*b* is formed larger than that of, for example, the positive electrode active material layer

21*b*. The widths of the first separator 25 and the second separator 26 are larger than that of the negative electrode active material layer 22*b*.

Figure 4:
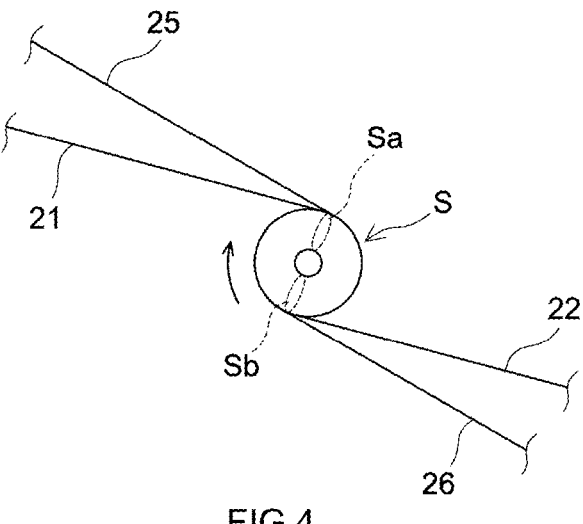
FIG. 4 is a schematic view of a method for manufacturing a wound electrode body.

FIG. 4 is a schematic view of a method for manufacturing a wound electrode body. FIG. 4 shows one example of the method for manufacturing a wound electrode body 20 shown in FIG. 3. With such a method for manufacturing a wound electrode body, first, two band-shaped separators 25 and 26, the band-shaped positive electrode sheet 21, and the band-shaped negative electrode sheet 22 are prepared while being respectively wound in a reel (not shown). The two band-shaped separators 25 and 26, the band-shaped positive electrode sheet 21, and the band-shaped negative electrode sheet 22 are set in a winding machine, and are guided along a prescribed path to a roller S. In the roller S, a first slit Sa and a second slit Sb are formed. In this embodiment, the roller S is in a generally cylindrical shape, and the first slit Sa and the second slit Sb are arranged at positions 180 degrees away from each other around the winding axis of the roller S. For manufacturing the wound electrode body 20, the tip of the first separator 25 is put in one of the first slit Sa and the second slit Sb of the roller S, and the tip of the second separator 26 is put in the other. Then, the roller S is wound a little, and the tip of the positive electrode sheet 21 is inserted between the second separator 26 wound in the roller S and the first separator 25 to be wound around the roller S. Further, the tip of the negative electrode sheet 22 is inserted between the first separator 25 wound around the roller S and the second separator 26 to be wound around the roller S. Thereafter, the roller S is further rotated, thereby winding the two band-shaped separators 25 and 26, the band-shaped positive electrode sheet 21, and the band-shaped negative electrode sheet 22. Subsequently, the electrode body in a cylindrical shape wound around the roller S is extracted from the roller S, and is squashed and collapsed from the side surface direction to be formed into a flat shape. In this manner, a flat wound electrode body 20 as shown in FIG. 3 is manufactured.

As shown in FIGS. 1 and 3, in the wound electrode body 20, the unformed part 21*a*1 of the positive electrode collecting foil 21*a* and the unformed part 22*a*1 of the negative electrode collecting foil 22*a* are directed to the opposite sides to each other in the width direction. Further, the first separator 25, the negative electrode sheet 22, the second separator 26, and the positive electrode sheet 21 are respectively made uniform in length direction, are sequentially stacked one on another, and are wound in a spiral form around the winding axis WL set in the width direction of the positive electrode sheet 21. The negative electrode active material layer 22*b* covers the positive electrode active material layer 21*b* with the first separator 25 and the second separator 26 interposed therebetween. The negative electrode active material layer 22*b* is covered with the first separator 25 and the second separator 26. A part of the positive electrode sheet 21 (in this embodiment, the unformed part 21*al*) protrudes from the first separator 25 and the second separator 26 on the first side 201 along the winding axis (the left-hand side in FIGS. 1 and 3). The protruding portion is bound, for example, in the direction orthogonal to the winding axis WL (e.g., the direction of stacking of the electrode sheet and the separator), and is joined with the internal terminal 31. A part of the negative electrode sheet 22 (in this embodiment, the unformed part 22*al*) protrudes from the first separator 25 and the second separator 26 on the second side 202 along the winding axis (the right-hand side in FIGS. 1 and 3). The protruding portion is bound, for example, in the direction orthogonal to the winding axis WL, and is joined with the internal terminal 41.

Figure 5:
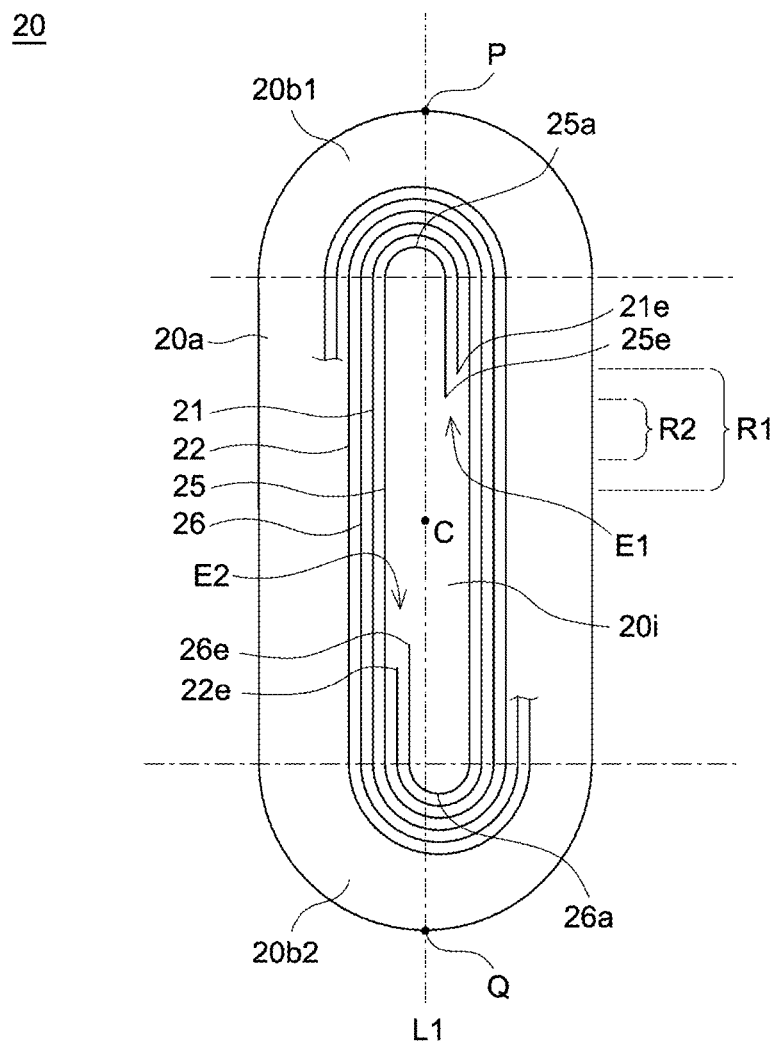
FIG. 5 is a schematic view of a cross section orthogonal to the winding axis of the wound electrode body 20.

FIG. 5 is a schematic view of the cross section orthogonal to the winding axis of the wound electrode body 20. As shown in FIG. 5, the wound electrode body 20 is formed in an oval shape having a rectangular part 20*a*, a first curved part 20*b1*, and a second curved part 20*b2* in cross section orthogonal to the winding axis WL. The rectangular part 20*a* is, for example, a site arranged at the center in the long side direction in cross section orthogonal to the winding axis WL, and is sandwiched from opposite sides in the same direction between the first curved part 20*b1* and the second curved part 20*b2*. In this embodiment, the rectangular part 20*a* has wide surfaces at opposite ends in the direction of stacking of the electrode sheet and the separator, respectively. For example, the rectangular part 20*a* has a first region R1 and a second region R2. The first region R1 is, for example, a site at which the electrode terminal (e.g., the connection piece 31*b* of the internal terminal 31 of the positive electrode) is arranged in connection between the electrode terminal and the wound electrode body 20. Further, the second region R2 is, for example, a site at which the electrode terminal (e.g., the connection piece 31*b* of the internal terminal 31 of the positive electrode) is joined in connection between the electrode terminal and the wound electrode body 20. The second region R2 is, for example, a site at which a junction part 91 described later is formed. The first curved part 20*b1* and the second curved part 20*b2* are, for example, sites arranged at the opposite ends in the long side direction, respectively, and interpose the rectangular part 20*a* therebetween. For the first curved part 20*b1* and the second curved part 20*b2*, for example, each outer surface includes a curved surface.

Incidentally, immediately after winding shown in FIG. 4, at the innermost circumference of the cylindrical electrode body, the first separator 25 and the second separator 26 are arranged, and the end (winding start end) of the separator comes in contact with the roller S. When the roller S is extracted from the electrode body, the winding start ends of the first separator 25 and the second separator 26 may be pulled out and deviated in a manner withdrawn thereby in the direction of extraction of the roller S. In the case where such position deviation of the first separator 25 and the second separator 26 is caused, when the electrode terminal is joined to the wound electrode body 20 manufactured as described above, the sites of the first separator 25 and the second separator 26 which has undergone position deviation may interfere with the junction part with the electrode terminal. The present inventor wished to make it difficult for such a phenomenon to be caused.

For the wound electrode body 20 manufactured by the foregoing procedure, as shown in FIG. 5, in the cross section orthogonal to the winding axis WL, the winding start end E1 on the positive electrode side and the winding start end E2 on the negative electrode side are arranged in an inner circumferential region 20*i* of the wound electrode body 20. In the inner circumferential region 20*i*, the winding start end E1 on the positive electrode side and the winding start end E2 on the negative electrode side can be arranged at positions point symmetrical with respect to the center C of the wound electrode body 20. Herein, the inner circumferential region 20*i* represents, for example, the region closer to the center C than to the outermost circumference of the wound electrode body 20. The center C can be the middle point of a line segment PQ connecting the first top P of the first curved part 20*b1* and the second top Q of the second curved part 20*b2*.

As shown in FIG. 5, the winding start end E1 on the positive electrode side includes the inner circumferential side end 25*e* of the first separator 25 and the inner circumferential side end 21*e* of the positive electrode sheet 21. In this embodiment, at the winding start end E1 on the positive electrode side, the first separator 25 extends more inward of the wound electrode body 20 than the positive electrode sheet 21. Further, the winding start end E2 on the negative electrode side includes the inner circumferential side end 26*e* of the second separator 26 and the inner circumferential side end 22*e* of the negative electrode sheet 22. In this embodiment, at the winding start end E2 on the negative electrode side, the second separator 26 extends more inward of the wound electrode body 20 than the negative electrode sheet 22.

In the embodiment shown in FIG. 2, when the wound electrode body 20 is accommodated in the battery case 10, the first curved part 20*b1* is arranged on the lid 14 side. Further, as shown in FIGS. 1, 2, and 5, the portion of the first separator 25 forming the innermost circumference of the wound electrode body 20 is bent in the first curved part 20*b1*. The inner circumferential side end 25*e* of the first separator 25 is arranged between the first junction part 91 at which the positive electrode sheet 21 and the positive electrode terminal 30 (e.g., the connection piece 31*b* of the internal terminal 31) are joined with each other and the first top P of the first curved part 20*b1* around the winding axis WL of the wound electrode body 20. The inner circumferential side end 25*e* can be arranged at, for example, the rectangular part 20*a*. In the embodiment shown in FIG. 5, the inner circumferential side end 25*e* is arranged in the first region R1 of the rectangular part 20*a*, and between the second region R2 and the first curved part 20*b1*.

As shown in FIG. 5, the folded part 25*a* adjacent to the inner circumferential side end 25*e* of the first separator 25 is arranged at the first curved part 20*b1*. The folded part 25*a* may desirably be, for example, on a straight line L1 connecting the first top P and the second top Q. The folding amount of the first separator 25 can be specified by the distance D1 from the folded part 25*a* to the inner circumferential side end 25*e*. The distance D1 is desirably smaller than the distance D2 from the folded part 25*a* to the end 91*a* on the lid 14 side of the first junction part 91. For example, the ratio of the distance D1 and the distance D2 (D1/D2) can be set at 0.2 to 0.95.

Further, in the embodiment shown in FIG. 2, when the wound electrode body 20 is accommodated in the battery case 10, the second curved part 20*b2* is arranged on the bottom surface 12*a* side of the case main body 12. Still further, as shown in FIGS. 1, 2, and 5, the portion of the second separator 26 forming the innermost circumference of the wound electrode body 20 is bent in the second curved part 20*b2*. The inner circumferential side end 26*e* of the second separator 26 is arranged between the first junction part 91 and the second top Q of the second curved part 20*b2* around the winding axis WL of the wound electrode body 20. The inner circumferential side end 26*e* may be desirably arranged, for example, between the end 91*b* on the bottom surface 12*a* side of the first junction part 91 (see FIG. 1) and the second top Q.

As shown in FIG. 5, the folded part 26*a* adjacent to the inner circumferential side end 26*e* of the second separator 26 is arranged at the second curved part 20*b2*. The folded part 26*a* may be desirably, for example, on a straight line L1. The folding amount of the second separator 26 can be specified by the distance from the folded part 26a to the inner circumferential side end 26e. Although the folding amount of the second separator 26 has no particular restriction, it is comparable to, for example, the distance D1.

As described above, although a description has been given to only the positive electrode side, the same also applies to the negative electrode side. For this reason, a detailed description herein is omitted. Incidentally, a reference numeral 92 in FIG. 1 represents the second junction part at which the negative electrode sheet 22 and the negative electrode terminal 40 (e.g., the connection piece of the internal terminal 41) are joined with each other.

In the secondary battery 100, the wound electrode body 20 has a band-shaped first separator 25, a band-shaped positive electrode sheet 21, a band-shaped second separator 26, and a band-shaped negative electrode sheet 22. The first separator 25, the positive electrode sheet 21, the second separator 26, and the negative electrode sheet 22 are respectively made uniform in length direction, are sequentially stacked one on another, and are wound around the winding axis WL set in the width direction of the positive electrode sheet 21. In addition, the cross section orthogonal to the winding axis WL is formed into a shape having a rectangular part 20a, and a first curved part 20b1 and a second curved part 20b2 sandwiching the rectangular part 20a. Thus, the wound electrode body 20 is accommodated in the accommodation space of the battery case 10. A part of the positive electrode sheet 21 protrudes from the first separator 25 and the second separator 26 on the first side 201 along the winding axis WL, is bound in the direction orthogonal to the winding axis WL, and is joined with the positive electrode terminal 30. A part of the negative electrode sheet 22 protrudes from the first separator 25 and the second separator 26 on the second side 202 along the winding axis WL, is bound in the direction orthogonal to the winding axis WL, and is joined with the negative electrode terminal 40.

In the cross section orthogonal to the winding axis WL, in the inner circumferential region 20i of the wound electrode body 20, the first separator 25 and the second separator 26 extend more inward of the wound electrode body 20 than the positive electrode sheet 21 and the negative electrode sheet 22, respectively. The portion of the first separator 25 forming the innermost circumference of the wound electrode body 20 is bent in the first curved part 20b1. The inner circumferential side end 25e of the first separator 25 is arranged between the first junction part 91 at which the positive electrode sheet 21 and the positive electrode terminal 30 are joined with each other, or the second junction part 92 at which the negative electrode sheet 22 and the negative electrode terminal 40 are joined with each other, and the first top P of the first curved part 20b1 around the winding axis WL of the wound electrode body 20. Further, in the cross section orthogonal to the winding axis WL, the portion of the second separator 26 forming the innermost circumference of the wound electrode body 20 is bent in the second curved part 20b2. The inner circumferential side end 26e of the second separator 26 is arranged between the first junction part 91 or the second junction part 92, and the second top Q of the second curved part 20b2 around the winding axis WL of the wound electrode body 20.

In other words, for the secondary battery 100, the winding start end of the wound electrode body 20 is bent at the first curved part 20b1 or the second curved part 20b2, and is arranged between the first top P or the second top Q and the first junction part 91 or the second junction part 92. Even slight deviation of the inner circumferential side end 25e of the first separator 25 or the inner circumferential side end 26e of the second separator 26 from a predetermined position is less likely to affect the joining between the electrode terminal and the wound electrode body 20. For this reason, joining between the electrode terminal and the wound electrode body 20 is less likely to be hindered by mutual deviation of the separators.

The winding start end of the wound electrode body 20 is bent at the first curved part 20b1 or the second curved part 20b2, so that the inner circumferential portions of the first curved part 20b1 and the second curved part 20b2 are increased in thickness, respectively. For this reason, when the wound electrode body 20 is manufactured, the curved part is applied with an appropriate pressure, and the curved part becomes a more obtuse angle, resulting in a change from line contact to surface contact, leading to the reduction of the applied pressure. For this reason, pressure resistance failure can be relaxed. Further, the inner circumferential portions of the first curved part 20b1 and the second curved part 20b2 are increased in thickness, respectively. For this reason, the curve at the curved part becomes gentle, which can suppress release of the electrode active material layer. For example, when the negative electrode active material layer 22b is suppressed from being released, precipitation of metal lithium can be suppressed.

Further, in this embodiment, the inner circumferential side end 25e of the first separator 25 is in the first region R1 of the rectangular part 20a, and is arranged between the second region R2 and the first curved part 20b1. Even when the inner circumferential side end 25e of the first separator 25 is in the first region R1 of the rectangular part 20a, the inner circumferential side end 25e is arranged closer to the first curved part 20b1 side than the second region R2. For this reason, the effect of suppressing interference of joining between the electrode terminal and the wound electrode body 20 can be implemented.

In the embodiment, the first electrode sheet was the positive electrode sheet 21, and the second electrode sheet was the negative electrode sheet 22. However, the present invention is not limited thereto. The first electrode sheet may be the negative electrode sheet 22, and the second electrode sheet may be the positive electrode sheet 21. In this case, the electrode sheet included in the winding start end E1 in the first curved part 20b1 arranged on the lid 14 side in the battery case 10 becomes the negative electrode sheet 22. Such a configuration is preferable for suppressing release of the negative electrode active material layer 22b.

Further, in the embodiment, the inner circumferential side end 25e of the first separator 25 was arranged on the first curved part 20b1 side. However, the present invention is not limited thereto. The following configuration is also acceptable: the inner circumferential side end 26e of the second separator 26 is arranged on the first curved part 20b1 side, and the inner circumferential side end 25e of the first separator 25 is arranged on the second curved part 20b2 side.

Second Embodiment

Figure 6:
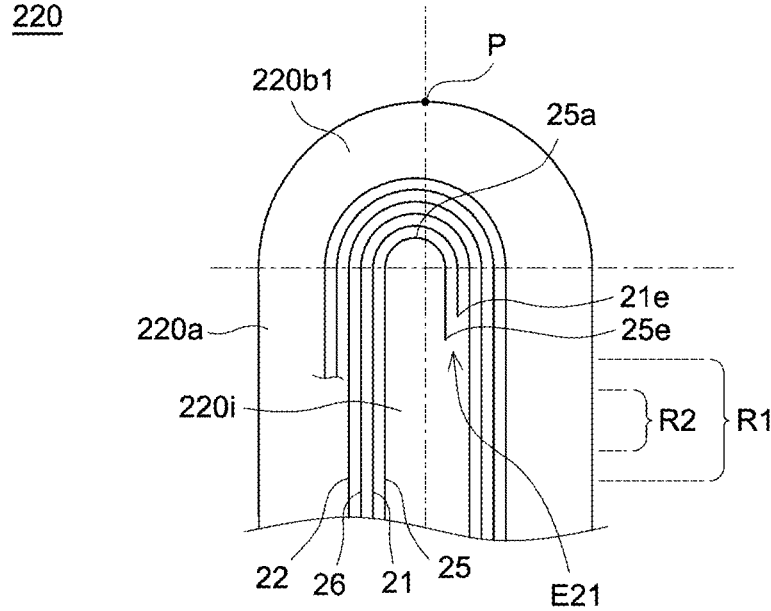
FIG. 6 is a schematic view of a part of the cross section orthogonal to the winding axis of a wound electrode body 220.

In the first embodiment, the inner circumferential side end 25e of the first separator 25 was arranged in the first region R1 of the rectangular part 20a. However, the arrangement site of the inner circumferential side end 25e is not limited thereto. FIG. 6 is a schematic view of a part of the cross section orthogonal to the winding axis WL of the wound electrode body 220. A secondary battery in accordance with a second embodiment is the same as the secondary battery 100 in accordance with the first embodiment, except for using a wound electrode body 220 as the power generating element. For this reason, a description overlapping with that on the secondary battery 100 will be omitted.

The wound electrode body 220 includes, for example, the inner circumferential side end 25*e* of the first separator 25, and the inner circumferential side end 21*e* of the positive electrode sheet 21 at the winding start end E21 on the positive electrode side. As shown in FIG. 6, the inner circumferential side end 25*e* of the first separator 25 is arranged closer to the first curved part 220*b*1 side than the first region R1 of the rectangular part 220*a*. In this embodiment, the inner circumferential side end 25*e* is arranged more distant from the second region R2 of the rectangular part 220*a*. For this reason, the effect of suppressing interference of joining between the electrode terminal and the wound electrode body 220 can be better implemented. Incidentally, the description on the wound electrode body 20 in the first embodiment applies to the wound electrode body 220 except for the foregoing description thereon. For this reason, a description herein is omitted. Further, a reference numeral and sign 220*i* in FIG. 6 is the inner circumferential region of the wound electrode body 220.

Third Embodiment

Figure 7:
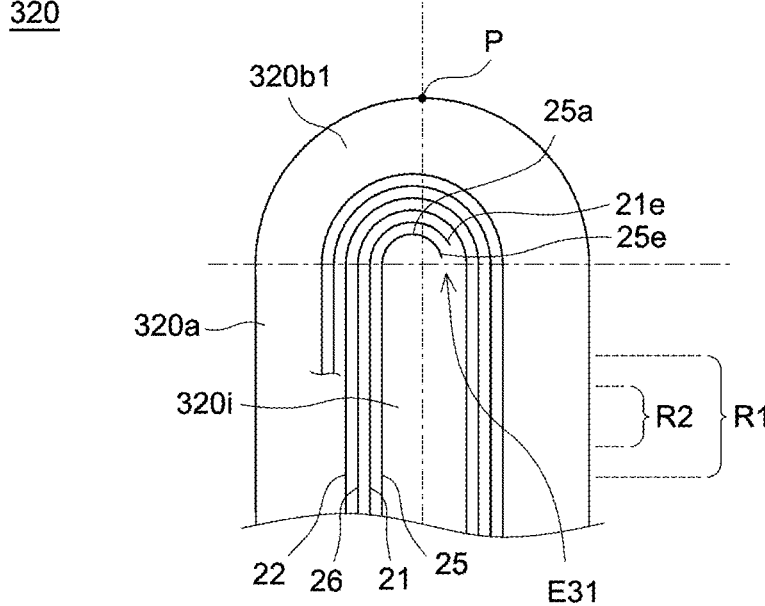
FIG. 7 is a schematic view of a part of the cross section orthogonal to the winding axis of a wound electrode body 320.

FIG. 7 is a schematic view of a part of the cross section orthogonal to the winding axis WL of a wound electrode body 320. A secondary battery in accordance with a third embodiment is the same as the secondary battery 100 in accordance with the first embodiment, except for using the wound electrode body 320 as a power generating element. For this reason, a description overlapping with that on the secondary battery 100 will be omitted.

The wound electrode body 320 includes, for example, an inner circumferential side end 25*e* of a first separator 25, and an inner circumferential side end 21*e* of a positive electrode sheet 21 at a winding start end E31 on the positive electrode side. As shown in FIG. 7, the inner circumferential side end 25*e* of the first separator 25 is arranged at a first curved part 320*b*1. In this embodiment, the inner circumferential side end 25*e* is arranged further distant from the second region R2 of the rectangular part 320*a*. For this reason, the effect of suppressing interference of joining between the electrode terminal and the wound electrode body 320 can be better implemented. Incidentally, the description on the wound electrode body 20 in the first embodiment applies to the wound electrode body 320 except for the foregoing description thereon. For this reason, a description herein is omitted. Further, a reference numeral and sign 320*i* in FIG. 7 is the inner circumferential region of the wound electrode body 320.

Up to this point, one embodiment of the technology herein disclosed has been described. Incidentally, the foregoing embodiments each show one example of the secondary battery to which the technology herein disclosed is applied, and are not intended to limit the technology herein disclosed.

What is claimed is:

1. A secondary battery, comprising:
 a battery case in which an accommodation space in a flat rectangular parallelepiped shape is formed;
 a wound electrode body accommodated in the battery case; and
 a first electrode terminal and a second electrode terminal connected with the battery case and the wound electrode body, wherein
 the wound electrode body has a band-shaped first separator, a band-shaped first electrode sheet, a band-shaped second separator, and a band-shaped second electrode sheet, and is accommodated in the accommodation space of the battery case in such a manner that,
 the first separator, the first electrode sheet, the second separator, and the second electrode sheet are made uniform in length direction, are sequentially stacked one on another, and are wound around a winding axis set in a width direction of the first electrode sheet, and
 a cross section orthogonal to the winding axis is formed into a shape having a rectangular part, and a first curved part and a second curved part sandwiching the rectangular part,
 the first electrode sheet partially protrudes from the first separator and the second separator on a first side along the winding axis, and is bound along a direction orthogonal to the winding axis to be joined with the first electrode terminal,
 the second electrode sheet partially protrudes from the first separator and the second separator on a second side along the winding axis, and is bound along the direction orthogonal to the winding axis to be joined with the second electrode terminal,
 in the cross section orthogonal to the winding axis,
 in an inner circumferential region of the wound electrode body, the first separator and the second separator extend more inward of the wound electrode body than the first electrode sheet and the second electrode sheet, respectively,
 a portion of the first separator forming an innermost circumference of the wound electrode body is bent in the first curved part, and an inner circumferential side end of the first separator is arranged between a first junction part at which the first electrode sheet and the first electrode terminal are joined with each other, and a first top of the first curved part around the winding axis of the wound electrode body, and
 a portion of the second separator forming the innermost circumference of the wound electrode body is bent in the second curved part, and an inner circumferential side end of the second separator is arranged between a second junction part at which the second electrode sheet and the second electrode terminal are joined with each other, and a second top of the second curved part around the winding axis of the wound electrode body,
 the battery case includes a bottom surface, and an opposite surface to the bottom surface,
 the first curved part is arranged between a center of the wound electrode body and the opposite surface,
 the second curved part is arranged between the center of the wound electrode body and the bottom surface of the battery case,
 the first junction part and the second junction part are arranged in the rectangular part,
 the inner circumferential side end of the first separator is arranged between the opposite surface and the first junction part, and
 the inner circumferential side end of the second separator is arranged between the bottom surface of the battery case and the second junction part.

2. The secondary battery according to claim 1, wherein the inner circumferential side end of the first separator and the inner circumferential side end of the second separator are not attached to each other.

3. The secondary battery according to claim 1, wherein the inner circumferential side end of the first separator and the inner circumferential side end of the second separator are arranged in the rectangular part.

4. The secondary battery according to claim 1, wherein the inner circumferential side end of the first separator is arranged in the first curved part.

5. The secondary battery according to claim 2, wherein in the inner circumferential region, the inner circumferential side end of the first separator and the inner circumferential side end of the second separator are arranged at positions point symmetrical with respect to the center of the wound electrode body, and the center of the wound electrode body is a middle point of a line segment connecting the first top of the first curved part and the second top of the second curved part.

6. The secondary battery according to claim 4, wherein in the inner circumferential region, the inner circumferential side end of the first separator and the inner circumferential side end of the second separator are arranged at positions point symmetrical with respect to the center of the wound electrode body, and the center of the wound electrode body is a middle point of a line segment connecting the first top of the first curved part and the second top of the second curved part.

7. The secondary battery according to claim 1, wherein the battery case includes
a case main body having the bottom surface and an opening opposite to the bottom surface, and
a lid mounted at the opening of the case main body, wherein the lid configures the opposite surface.

\*    \*    \*    \*    \*